US00RE34934E

United States Patent [19]

Raterman et al.

[11] E Patent Number: Re. 34,934

[45] Reissued Date of Patent: May 9, 1995

[54] COIN SORTER WITH COUNTER AND BRAKE MECHANISM

[76] Inventors: Donald E. Raterman, 1345 Carol La., Deerfield, Ill. 60015; Richard A. Mazur, 1508 Culpepper Dr., Naperville, Ill. 60540; Richard D. Primdahl, 1125 Worthington Dr., Hoffman Estates, Ill. 60194

[21] Appl. No.: 132,715

[22] Filed: Oct. 6, 1993

Related U.S. Patent Documents

Reissue of:

[64] Patent No.: 5,055,086
Issued: Oct. 8, 1991
Appl. No.: 475,127
Filed: Feb. 5, 1990

U.S. Applications:

[63] Continuation-in-part of Ser. No. 113,869, Oct. 27, 1987, Pat. No. 4,921,463.

[51] Int. Cl.[6] ..... G07D 3/16

[52] U.S. Cl. ..... 453/10; 453/32; 453/57

[58] Field of Search ..... 453/6, 10, 32, 57; 188/72.1, 161

[56] References Cited

U.S. PATENT DOCUMENTS

| | | | |
|---|---|---|---|
| Re. 29,090 | 12/1976 | Fougere . | |
| 2,835,260 | 5/1958 | Buchholz . | |
| 3,246,658 | 4/1966 | Buchholz et al. . | |
| 3,368,657 | 2/1968 | Wrensch et al. | 192/84 |
| 3,458,022 | 7/1969 | Reiff | 192/84 |
| 3,587,798 | 6/1971 | Schuman | 192/12 |
| 3,861,567 | 1/1975 | Davis | 222/333 |
| 3,984,033 | 10/1976 | Groth et al. | 222/333 |
| 3,998,237 | 12/1976 | Kressin et al. . | |
| 4,274,409 | 6/1981 | Bush | 128/215 |
| 4,383,540 | 5/1983 | De Meyer et al. . | |
| 4,430,592 | 2/1984 | Manketolow | 310/93 |
| 4,564,036 | 1/1986 | Ristuedt . | |
| 4,570,655 | 2/1986 | Raterman . | |

FOREIGN PATENT DOCUMENTS

| | | | |
|---|---|---|---|
| 0149906 | 7/1985 | European Pat. Off. | 453/6 |

OTHER PUBLICATIONS

Inertia Dynamics Product Catalog, "Electric Clutches and Brakes", Catalog CB485, pp. 1-20 Apr. 1986.

*Primary Examiner*—F. J. Bartuska
*Attorney, Agent, or Firm*—Arnold, White & Durkee

[57] ABSTRACT

A coin sorter having a rotatable disc includes a brake mechanism for stopping rotation of the disc in response to a predetermined number of counted coins. The disc is driven through a gear train by an electric motor. The brake mechanism includes a first brake mechanism coupled to the motor for stopping rotation thereof, a second brake mechanism coupled to the coin disc for stopping rotation thereof, and a control mechanism for operating the brake mechanisms in a synchronous manner so as to avoid any shock loads upon the gear train due to existence of torque differentials on either ends thereof. The brake mechanisms are adapted to have substantially identical stopping times and are operated in such a manner as to be energized in a substantially instantaneous manner when the braking sequence is initiated.

28 Claims, 7 Drawing Sheets

SYNCHRONOUS BRAKING SEQUENCE
500
BRAKE SIGNAL
502
(BRAKE) OFF
(BRAKE) ON
START
A
B
TA
(BRAKE) OFF

MOTOR SIGNAL
504
(BRAKE) OFF
(BRAKE) ON

BRAKE DRIVER OUTPUT
506
V-HOLD
VB
TB

BRAKE CURRENT
508
I-HOLD

BRAKE ENGAGEMENT STATUS
510
INACTIVE
ACTIVE
BRAKE DELAY TD
INACTIVE

MOTOR/DISC VELOCITY
512
V1/V2
TV
0
CAPACITOR VOLTAGE
514
CT FULLY CHARGED
READY
CT DISCHARGING
CT CHARGING
READY
TC
0

COIN SORTER WITH COUNTER AND BRAKE MECHANISM

Matter enclosed in heavy brackets [ ] appears in the original patent but forms no part of this reissue specification; matter printed in italics indicates the additions made by reissue.

This is a continuation-in-part of application Ser. No. 07/113,869, filed on Oct. 27, 1987, now U.S. Pat. No. 4,921,463.

BACKGROUND OF THE INVENTION

1. Field Of The Invention

The present invention relates generally to coin sorters of the type which use a rotatable disc having a resilient surface operating with an adjacent stationary guide plate and, more particularly, to such sorters which have a counter for counting the number of coins sorted and a brake for stopping the disc when the counter indicates that a preselected number of coins have been sorted.

2. Summary of the Invention

It is a primary object of the present invention to provide a coin sorter of the type described above which has an improved drive and brake system for stopping the rotatable disc quickly and reliably over a large number of operating cycles.

It is another important object of this invention to provide such a coin sorter having a drive and brake system which is relatively inexpensive to install and maintain.

A further object of the invention is to provide such a coin sorter having a drive and brake system which permits the use of a relatively small brake mechanism.

Other objects and advantages of the invention will become apparent from the following detailed description and the accompanying drawings.

In accordance with the present invention, the foregoing objectives are realized by providing a coin sorter having a rotatable disc with a resilient surface and a stationary guide plate positioned adjacent to the resilient surface for guiding coins on the resilient surface as the disc is rotated; counting means for counting coins of at least one denomination as the coins are processed by the sorter; an electric motor having an output shaft for driving the rotatable disc; a speed-reducing gear train connected between the output shaft of the electric motor and the rotatable disc; and first braking means responsive to the counting means for stopping the rotatable disc when a preselected number of coins have been counted, the braking means being connected to the output shaft of the motor, and, in an alternative embodiment, a second braking means is coupled to the rotatable disc.

The first braking means preferably comprises an armature fixed to the output shaft cf said motor and including a disc forming a flat surface to which braking pressure can be applied, and an electromagnetic actuator for applying braking pressure to the flat surface of said disc when said actuator is supplied with electrical power. The second braking means is preferably a tension brake including an electromagnetic coil secured to the coin sorter and a brake disc secured to the rotatable disc. According to a preferred embodiment, the first and second feature of braking means are operated in synchronism during the braking sequence in such a manner that (i) both the braking means are activated simultaneously with a minimal activation delay and, (ii) the stopping times corresponding to both the braking means are substantially identical. The effect of the synchronized braking action is to minimize damaging torque being applied to the speed-reducing gear train and to reduce the possibility of gear train wind-up and the associated errors in coin counting.

BRIEF DESCRIPTION OF THE DRAWINGS

[FIG. 11 is]

Figure 1:
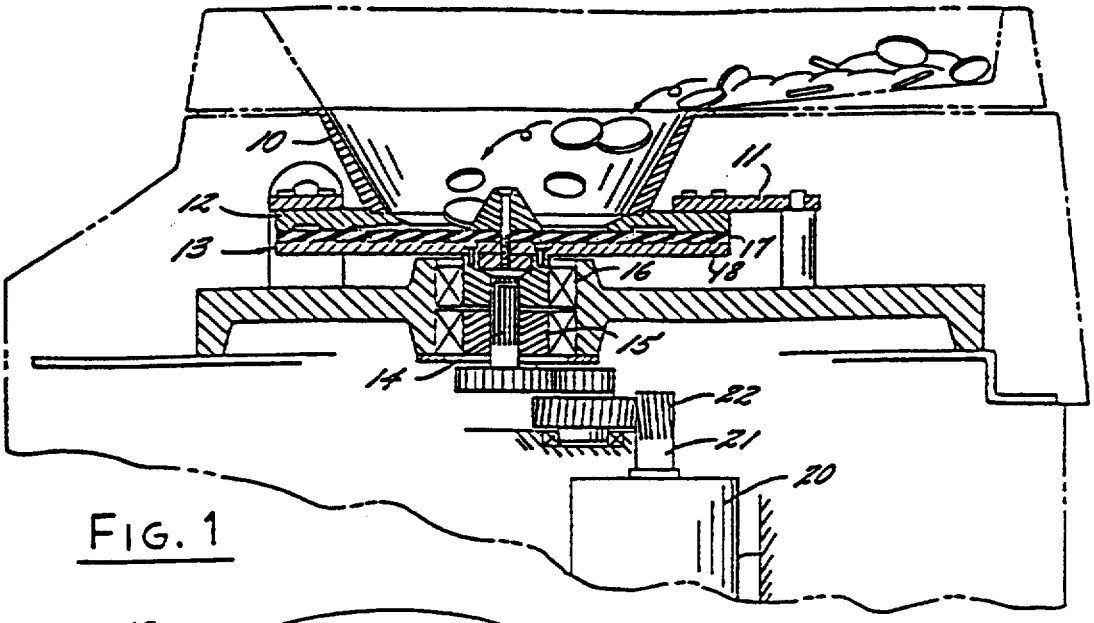
FIG. 1 is a vertical section of a coin sorter embodying the present invention.

While the invention is susceptible to various modifications and alternative forms, specific embodiments thereof have been shown by way of example in the drawings and will be described herein in detail. It should be understood, however, that it is not intended to limit the invention to the particular forms disclosed, but, on the contrary, the intention is to cover all modifications, equivalents and alternatives falling within the spirit and scope of the invention as defined by the appended claims.

DESCRIPTION OF THE PREFERRED EMBODIMENT

Turning now to the drawings, there is shown a coin sorter which includes a hopper 10 for receiving coins of mixed denominations and feeding them through central openings in a housing 11 and an annular sorting head or guide plate 12 inside the housing. The coins are deposited on the top surface of a disc 13 mounted for rotation on a splined stub shaft 14 which fits into a hub 15 affixed to the bottom of the disc. The hub 15 in turn is mounted within ball bearings 16 in the base of the housing 11.

The disc 13 comprises a resilient pad 17 bonded to the top surface of a solid metal disc 18. The top surface of the resilient pad 17 is typically covered with a durable fabric bonded to the pad itself, which is typically made of a resilient rubber material As the disc 13 is rotated, the coins deposited on the top surface thereof tend to move outwardly over the surface of the pad due to centrifugal force. The coins which are lying flat on the pad travel outwardly beneath the guide plate 12 because the underside of this plate is spaced above the pad 17 by a distance which is slightly greater than the thickness of the thickest coin.

Figure 2:
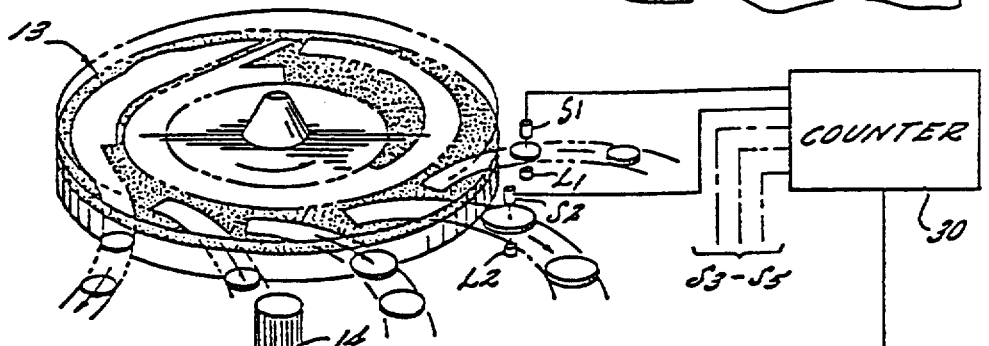
FIG. 2 is a perspective view, on a reduced scale, of the coin sorter shown in FIG. 1.

The bottom surface of the guide plate 12 is configured to sort the coins by denomination as the coins are rotated beneath the plate 12 by the disc 13. All illustrated in FIG. 2, different denominations of coins are eventually ejected at different circumferential locations around the periphery of the guide plate 12. The particular configuration of the guide plate surface which affects the sorting may be any of a variety of different designs, one example of which is described in the assignee's co-pending U.S. Pat. application Ser. No. 034,271 filed Apr. 1, 1987, the disclosure of which is incorporated herein by reference.

It is important that the disc 13 remain flat, without any flexing, twisting or other physical distortion, in order to prevent any missorting of the coins. To provide such stability, the metal disc 18 must be made rigid and massive enough to withstand the pressure exerted thereon by the rotating coins as they are pressed down into the pad 17 by the fixed guide plate 12.

In order to drive the disc 13 at a controlled angular velocity, an electric motor 20 is connected to the disc through a speed-reducing gear train. Thus, the motor 20 has an output shaft 21 which carries a helical pinion gear 22. The pinion 22 meshes with a gear wheel 23 carrying a pinion 24 which, in turn, meshes with a gear wheel 25 on the lower end of the stub shaft 14. With this speed-reducing gear train, the disc 13 is typically driven at 200 rpm by a motor turning at 1750 rpm.

Because of the torque-multiplying effect of the gear train, the output torque of the motor 20 can be much less than the torque required to drive the disc 13. For example, with the type of gear train illustrated, an electric motor producing a starting torque of 84 inch-pounds and a running torque of 60 inch-pounds can bring a 3-pound, 11-inch diameter disc 13 up to speed within about 0.3 second, even when the sorter is loaded with coins.

For the purpose of counting the number of coins of each denomination discharged from the sorter, an electronic counter 30 receives signals from multiple photosensors S1–S5 located adjacent the respective coin discharge paths. These photosensors S1–S5 normally receive light from corresponding light sources L1–L5, but the light beam is interrupted each time a coin passes between one of the sources L1–L5 and the corresponding one of the sensors S1–S5. Whenever one of the light beams is interrupted, the interruption produces a positive transition in the electrical output of the corresponding photosensor S1–S5, and this transition is detected by the counter 30. Each positive transition is treated as a separate count, and the number of counts from each sensor is accumulated until it reaches a preselected level. Typically, the preselected level represents the number of coins desired in a particular type of receptacle such as a coin bag attached to the sorter. As an alternative, the sensing arrangement may use magnetic sensors, with coin correcting being based on the change in electromagnetic field generated each time a coin passes across the sensors In accordance with one important aspect of the present invention, a brake mechanism responsive to the counter 30 is connected to the motor output shaft 21 for stopping the rotating disc 13 when a preselected number of coins has been counted. When the disc 13 is rotating, it has a moment of inertia which is a function of the mass, size and shape of the disc. The torque applied to the drive train by the rotating disc is a function of both the moment of inertia and the angular acceleration of the disc. In order to bring the rotating disc to a stop, this load torque produced by the disc must be overcome by the braking torque and the frictional resistance applied to the disc by any coins thereon and the pressure of the stationary guide plate 12 on those coins. By applying the braking force to the output shaft of the drive motor, a relatively small torque is sufficient to brake the rotating disc because the braking torque applied to the motor shaft is multiplied by the speed-reducing gear train. Thus, the disc can be quickly and reliably stopped with a relatively inexpensive brake mechanism which has a long operating life, e.g., in excess of a million operating cycles.

Figure 3:
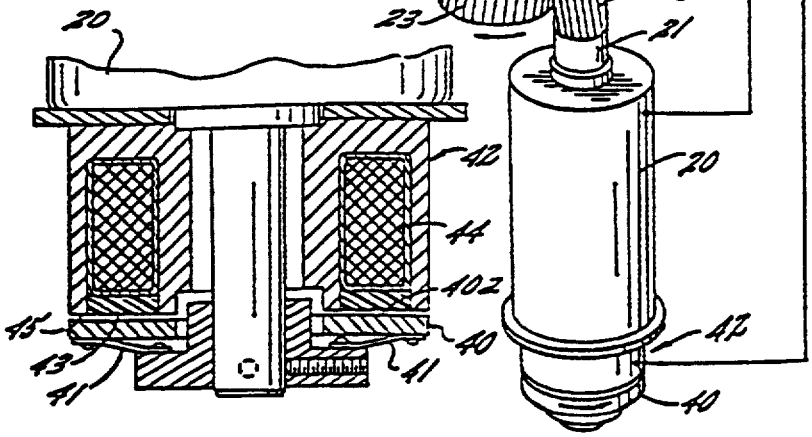
FIG. 3 is a vertical section of the brake mechanism included in the coin sorter of FIGS. 1 and 2.

The preferred brake mechanism for use in this invention is an electrically powered disc brake. Thus, in the illustrative embodiment shown in FIG. 3, an armature 40 mounted on the lower end of the motor shaft 21 forms a disc with a flat surface 40a to which braking pressure may be applied to stop the drive train. The armature 40 is mounted for limited axial movement relative to the shaft 21 by means of a plurality of spring elements 41. To apply braking pressure to the disc 40, a stationary electromagnetic actuator 42 is mounted directly beneath the disc 40. The actuator 42 includes a friction ring 43 for gripping the disc surface 40a with a minimum of slippage. The actuator also includes a coil 44 which, when energized from an electrical power source, magnetizes a stator 45 to draw the disc 40 into tight engagement with the friction ring 43. The braking torque thus applied to shaft 21 is multiplied by the speed-reducing gear train and applied to the disc 13 via the stub shaft 14.

One example of a commercially available brake mechanism of the type described above is the Type FB17 Power-On Disc Brake made by Inertia Dynamics, Inc. of Collinsville, Conn.

To control the energization of the electromagnetic brake, the output signal from the counter 30 is supplied to a driver circuit 31 which controls the electrical current fed to the coil 44. This same driver circuit 31 also controls the electrical power supplied to the electric drive motor 20. When the counter output indicates that the desired number of coins have been discharged from one of the sorter exit slots, the driver circuit 31 de-energizes the motor 20 and energizes the coil 44 so that the motor 20 is no longer driving its output shaft when the brake is applied.

The actuator coil 44 is preferably energized initially at a relatively high power level to quickly initiate the braking action, and then at a lower power level to bring the disc 13 and its drive train to a complete stop. For example, with the particular brake mechanism identified above, the driver circuit 31 preferably applies 36 volts across the coil for about 5 milliseconds, and then 12 volts for a further 25 milliseconds. With these voltage levels, the disc 13 can be brought to a complete stop in about 20 milliseconds. This braking time corresponds to an angular movement of the disc of only about 15 degrees, which is small enough to prevent the discharge of additional unwanted coins in most situations.

In accordance with a further aspect of the invention, the helical pinion gear on the output shaft of the motor 20 has teeth pitched in a direction to urge the shaft axially away from the electromagnetic actuator of the brake mechanism in response to a driving torque from the motor, so that application of a braking torque to the shaft urges the shaft axially toward to electromagnetic actuator. Thus, in the particular embodiment illustrated in FIG. 2, the pitch of the teeth on the pinion gear 22 produces a force vector in the direction of the axis of the motor shaft 21 which biases the shaft downwardly so that the armature 40 is urged away from the stationary actuator 42 when the motor is driving the disc 13 during a sorting operation. When the motor is de-energized and the brake energized to stop the disc 13, the direction of the axial force vector is reversed so that the motor shaft 21 is biased upwardly to draw the armature 40 toward the electromagnetic actuator 42. This provides a brake boost which supplements the braking force applied by the energization of the electromagnetic actuator.

Figure 4:
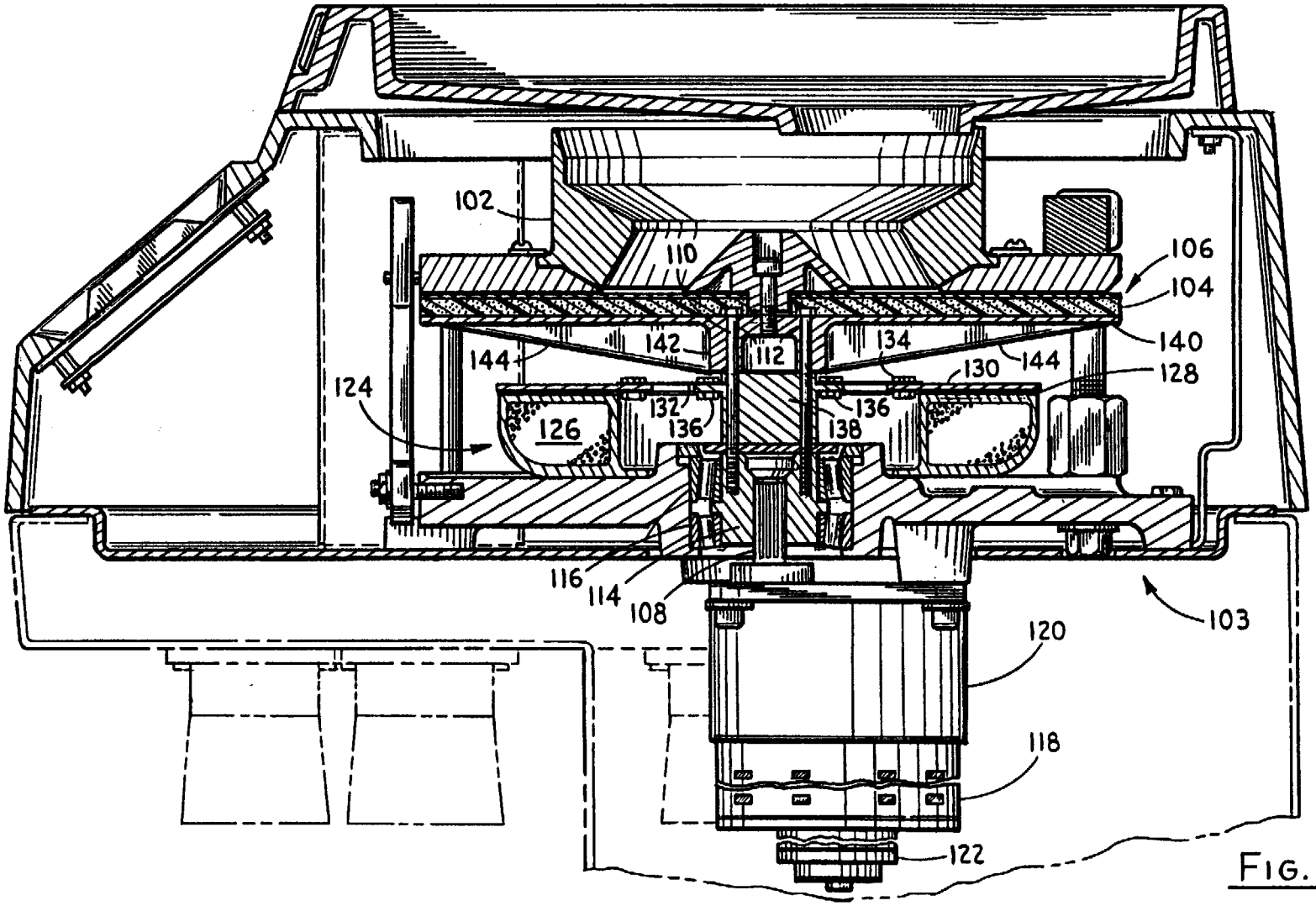
FIG. 4 is a vertical cross sectional view of a second embodiment of a coin sorter including first and second brakes.

Referring to FIG. 4, there is illustrated an alternative coin sorter generally designated by the reference number 100. The coin sorter 100 is similar to the coin sorter illustrated in FIGS. 1–3 in that it includes a hopper 102 mounted on a chassis 103 of the coin sorter 100. The hopper 102 receives coins of mixed denominations and directs the coins onto an upper surface of a coin pad 104. The coin pad 104 corresponds to the resilient pad 17 included with the coin sorter illustrated in FIGS. 1–3.

The coin pad 104 is secured to a finned coin disc 106 that is made of a light-weight material of high structural strength such as cast aluminum. The disc 106 is connected to a splined stub shaft 108 by elongated fasteners such as bolts 110 that extend through apertures 112 in the finned disk 106 and are anchored in a bushing 114. The bushing 114 is securely affixed to the splined stub shaft 108 and is rotatably mounted within the chassis 103 by bearings 116.

To rotate the coin disc, the splined stub shaft 108 is connected to a gear motor 118 through a speed reducing gear train 120. The gear motor 118 is substantially the same as the electric motor 20 in the coin sorter illustrated in FIGS. 1–3. The gear train 120 is substantially the same as the speed reducing gear train including gear wheel 23, pinion 24 and gear wheel 25 illustrated in FIG. 2. The gear motor 118 functions to rotate the disc 106, and a disc brake 122 stops in rotation. The disc brake 122 corresponds to the brake mechanism in the coin sorter illustrated in FIGS. 1–3.

It has been determined that the rotation of the finned disk 106 can be stopped in approximately 20 milliseconds using the disc brake 122. Although this period of time is considered very good, it is desirable to attain faster stopping of the finned coin disc 106 to minimize overcounting of coins. Overcounting of coins occurs when rotation of the coin disc is not stopped upon counting the programmed number of coins. This occurs when, as the last coin of the programmed number of coins is counted, one or more additional coins are passed through the counter before rotation of the coin disc can be completely stopped. This overcounting is problematic since the operator is required to remove the extra coins from the coin bag before the bag is sealed. It is a goal of the coin sorting industry to eliminate or minimize overcount by stopping the coin disc instantly after the programmed number of coins has been counted.

An additional problem with prior art coin sorters is angular deflection of the shaft of the gear motor, of the gears in the speed reducing gear train, and of the splined stub shaft of the gear motor. This angular deflection occurs upon abrupt stopping of the gear motor and the coin disc. In prior art coin sorters this angular deflection is due to the resilience of the motor shaft of the gear motor, the gears of the speed reducing gear train, and the splinted stub shaft and results in a whipping or oscillating motion of the coin disc. If a coin is partially in a coin chute and partially on the coin disc, this oscillation causes the coin to move into and out of the counter resulting in the same coin being counted several times.

A further problem experienced by prior-art coin sorters occurs as a braking action is applied to the gear motor. This causes abrupt stopping and the torque displacement generated by the high inertia of the coin disc applies a potentially destructive torque on the gears in the speed reduction gear train. Repeated application of this torque eventually results in a break down of the gear train.

To overcome these problems in the prior art, the coin sorter 100 is provided with a tension or friction brake assembly generally designated by the reference numeral 124. The tension or fiction brake assembly 124 is mounted adjacent to the finned coin disc 106 and is energized at substantially the same time as the disc brake 122 in accordance with a synchronized braking arrangement, as will be described in detail below. The combined effect of the disc brake 122 and the tension or friction brake assembly 124 brings the finned coin disc 106 to a complete stop within a substantially small time period of about 10 milliseconds or less. This period of time substantially reduces the likelihood of overcount. The synchronized braking arrangement also assures that the gear motor 118 is stopped by the disc brake 122 at substantially the same instant that the finned coin disc 106 is stopped by the tension or friction brake assembly 12, as will also be described in detail below. Accordingly, the torque applied to the speed reducing gear train 120 is substantially reduced. As a result, virtually no load is applied on the speed reducing gear train 120, significantly extending the life expectancy of the gear train 120. Furthermore, the quick, complete stopping of the coin disc 106 eliminates or reduces the overcount due to a coin oscillating into and out of the counter due to torsional elasticity of the coin disc 106, speed reducing gear train 120 and the gear motor 118.

The tension or friction brake assembly 124 may be a Warren 825 tension brake that includes an electromagnetic coil 126 rigidly mounted to the chassis 103. The coil 126 includes an upper surface 128 that is covered with a friction material. The tension or friction brake assembly 124 also includes a brake disc 130 mounted by a diaphragm spring 132 to position the brake disc 130 in slight contact with the upper surface 128 of the coil 126. The diaphragm spring 132 is fixed at a first edge to the brake disc 130 by a fastener 134, and is secured at a second edge by fasteners 136 to a hub 138. The hub 138 is rigidly fixed to the finned disc 106 by the fasteners 110. This mechanical connection allows the brake disc 130 to rotate with the finned disc 106 while the brake disc 130 lightly engages the upper surface 128 of the coil 126.

When the coil 126 is energized, such as when a preselected number of coins have been sorted and counted, the magnetic field created by the coil 126 draws the brake disc 130 and the diaphragm spring 132 is flexed thereby allowing the brake disc 130 to move into tight engagement with the upper surface 128 of the coil 126. This engagement stops the rotation of the finned coin disc 106. Once the coin disc 106 is stopped, the brake coil 126 can be de-energized. The diaphragm spring 132 will then return to its normal position lifting the brake disc 130 slightly off the upper surface 128 of the coil 126. Since only a minimum amount of movement of the brake disc 130 and the diaphragm spring 132 is required in order to engage the tension or friction brake assembly 124, the tension or friction brake assembly 124 has a faster braking action. Thus, the only limitation to how fast the tension or friction brake assembly 124 can be actuated to brake the rotation of the finned coin disk 106 is how fast the coil 126 can be saturated with current.

The coil 126 is relatively large and requires considerable current in order to generate the desired magnetic field. Since the coil 126 is larger than the coil in the brake 122, if the tension or friction brake assembly 124 receives the same current at the same time as the coil in the brake 122, the tension or friction brake assembly 124 will be actuated slower than the brake 122. A delay between the actuation of the brake 122 and the tension or friction brake assembly 124 can result in the application of damaging torque to the gears in the gear box section 120. Therefore, there is a need to control the amount of current directed to the coil 126 and to the coil in the brake 122 so that the brake 122 and the tension or friction brake assembly 124 are both activated at the same time.

In coin sorters it is desireable that the coin disc be rigid to minimize deflection at the rim and to increase sorting accuracy. Rigidity should not be provided, however, by structure that adds weight since the coin disc should be light weight to minimize the load on the gear box and to allow quick stopping. Typically, only a very slight deflection at the rim of a coin disc can be tolerated in order to maintain the desired accuracy in sorting and counting. The deflection that can be tolerated is generally about 0.005 inches.

Figure 5:
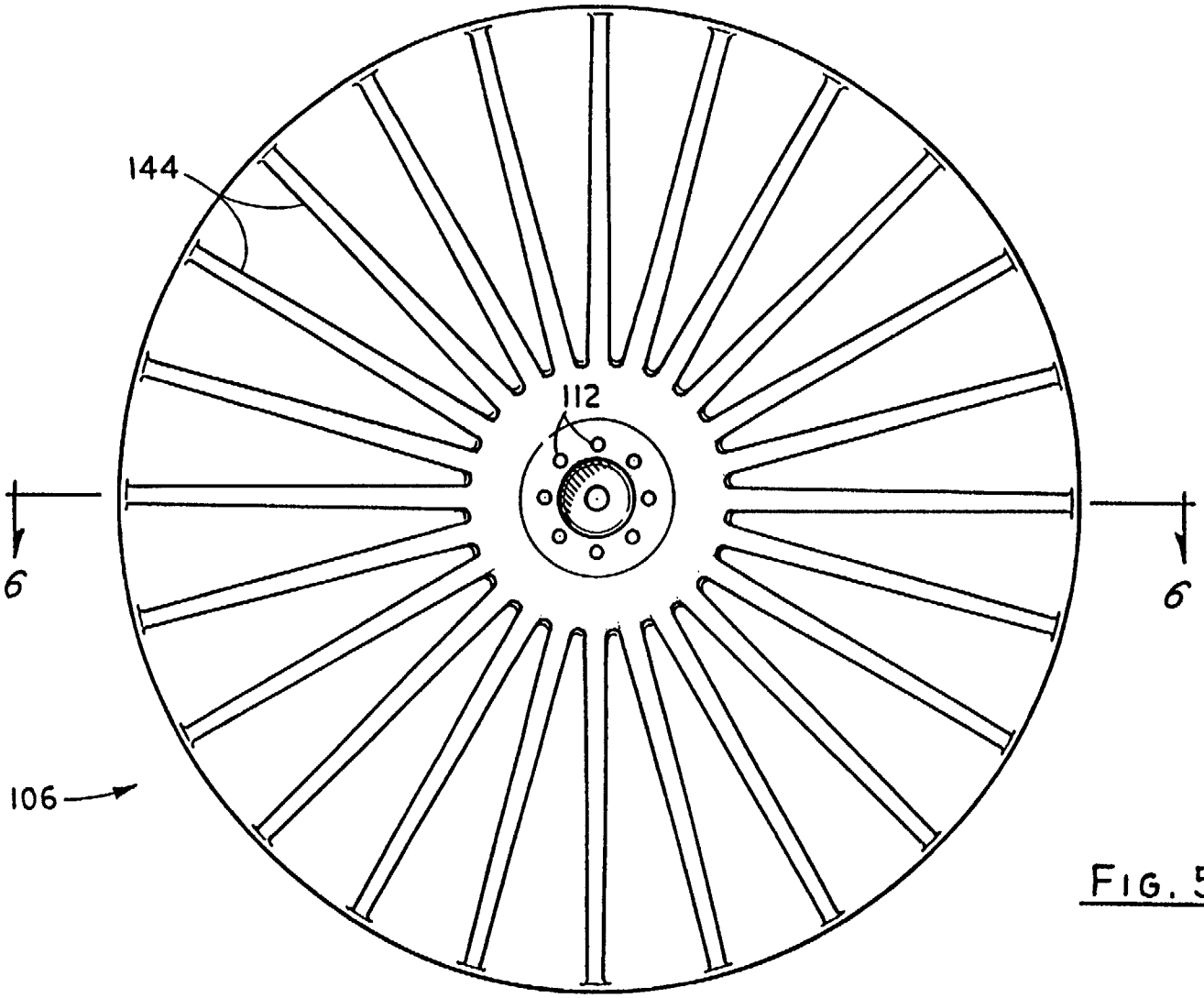
FIG. 5 is an enlarged, bottom plan view of a finned coin disc for use with the coin sorter illustrated in FIG. 4.
Figures 6, 7, 8:
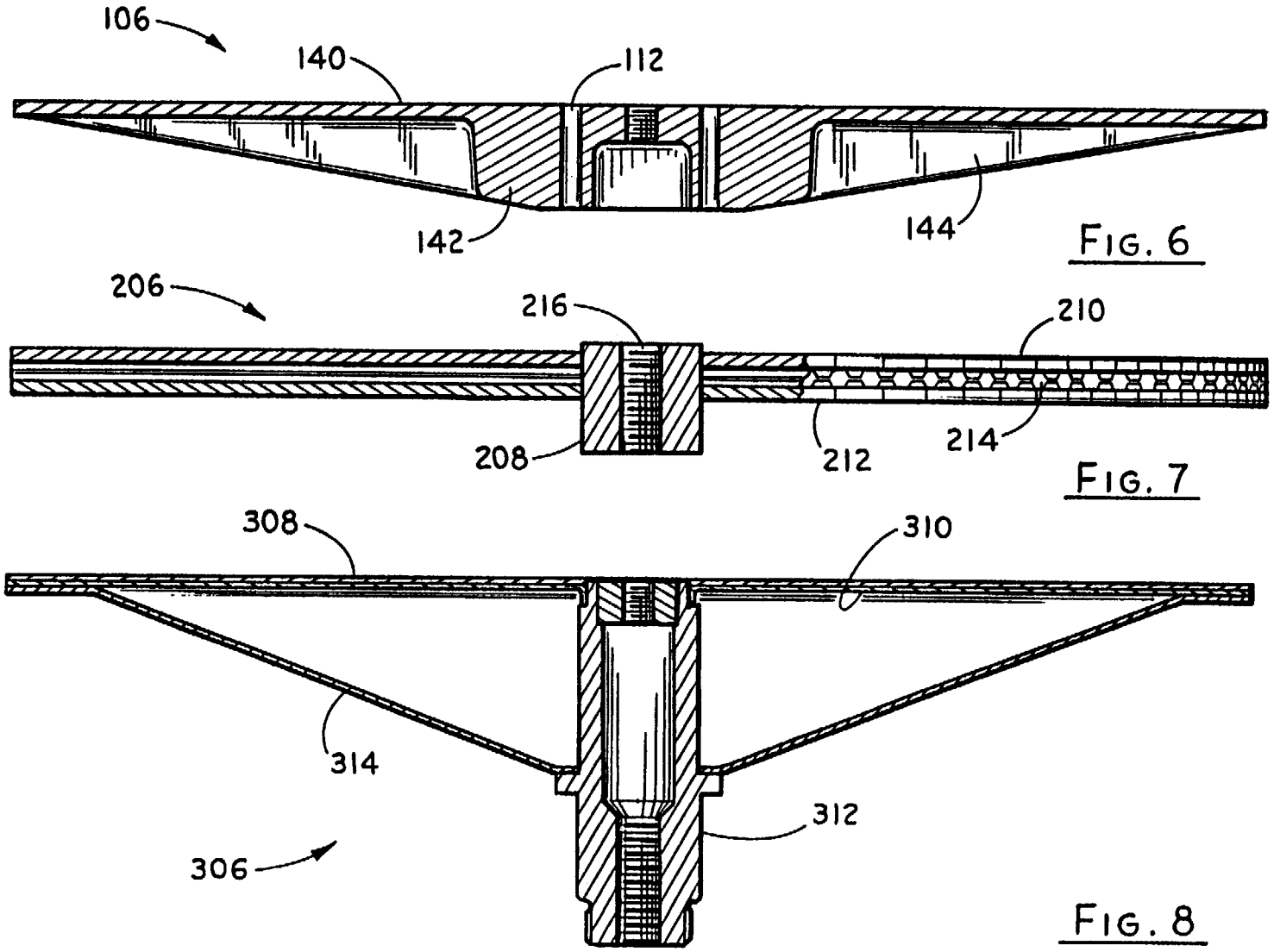
FIG. 6 is a view taken along line 6—6 in FIG. 5.
FIG. 7 is a vertical cross sectional view of a coin disc including three sheets of material secured together for use with the coin sorter of FIG. 4.
FIG. 8 is a vertical cross sectional view of a hollow coin disc for use with the coin sorter of FIG. 4.

Rigidity and light weight are best attained by maintaining strength at the rim of the coin disc while moving most of the mass of the coin disc to the center of the disc. The finned coin disc 106 has this combination of rigidity and weight. As shown in FIG. 5, the finned disc 106 is defined by a thin, aluminum upper plate 140 that is integral with a central hub 142. A plurality of thin ribs or fins 144 are integrally formed on the underside of the thin circular plate 140 (FIGS. 5 and 6). As measured from the edge or rim of the plate 140 toward the hub 142, the fins 144 are narrow in width and of increasing height, with the greatest height of the ribs 144 being adjacent the hub 142. The fins 144 allow the coin disc 106 to be of low mass and relatively thin at the rim to reduce spinning inertia and yet be thick adjacent the hub to provide high deflection strength.

The light weight and strong coin disc 106 works with the tension or friction brake assembly 124 and the brake 122 to reduce the overall braking time of the coin disc 106. In addition, the weight of the coin disc 106 reduces the load imposed on the speed reducing gear box 120 during start-up and braking, thus minimizing any destructive torque applied to the gears disposed in the speed reducing gear box 120.

Alternative coin discs can also be used with the coin sorter 100. One alternative disc is the coin disc 206 illustrated in FIG. 7. The coin disc 206 includes a central hub 208 with a top sheet of metal 210 and a bottom sheet of metal 212. A honeycomb metal sheet 214 is positioned between the top sheet 210 and the bottom sheet 212. In one preferred embodiment, the top sheet 210 and the bottom sheet 212 are solid aluminum sheets and the central honeycomb sheet 214 is also made of aluminum. The top sheet 210 is bonded to the honeycombed sheet 214 by an adhesive. A similar adhesive bonds the bottom sheet 212 to the honeycomb sheet 214, and the disc 206 so formed is secured to the hub 208. The hub 208 includes a central aperture or bore 216 into which the splined stub shaft 108 is positioned to connect the disc 206 to the gear motor 118.

An alternative to using adhesive to join the top sheet 210 and the bottom sheet 212 to the aluminum honeycomb sheet 214 is to use a brazing process. Another alternative of the disc 206 is to use a top metal sheet 210 fabricated of aluminum that is brazed to a steel honeycomb sheet 214; a bottom aluminum sheet 212 is then brazed to the honeycomb sheet 214.

It is known that the forces imposed upon a coin disc include a tension load on the upper surface of the coin disc and a compression load on the underside. It has been determined that material in the center of the underside of a coin disc is not under load and can be eliminated without lessening the structural strength of the coin disc. In accordance with this determination, the hollow coin disc 306 illustrated in FIG. 8 may be used with the coin sorter 100.

The hollow coin disc 306 includes a top aluminum plate 310 including an aluminum facing 308 bonded to the plate 310. The aluminum plate 310 is welded to a machined steel hub 312. The steel hub 312 may be secured to the splined stub shaft 108. A hollow conical steel housing 314 is seam-welded to the aluminum plate 310 and the machined steel hub 312. During rotation of the hollow coin disc 306, tension forces are experienced on the plate 310 and a compressive load is applied to the hollow steel housing 314. The hollow coin disc 306 minimizes the amount of material needed while maintaining the desired rigidity. As a result, the hollow coin disc 306 is light weight. Since the weight of the hollow coin disc 306 is minimized, the destructive torque applied on the speed reducing gear box 120 is also reduced.

Although each of the coin discs 106, 206 and 306 has been described as being fabricated of metal such as aluminum, other materials can be used. For example, commercially available injection-molded composite plastic material available can be used instead of metal. Composite materials have the advantage of being very light weight yet strong and resistant to deflection.

As can be seen from the foregoing detailed description, this invention provides a coin sorter with an improved drive and brake system which stops the rotatable disc of the sorting mechanism quickly and reliably over a large number of operating cycles. Equally important is the fact that the drive and brake system is relatively inexpensive to install and maintain.

Figure 9:
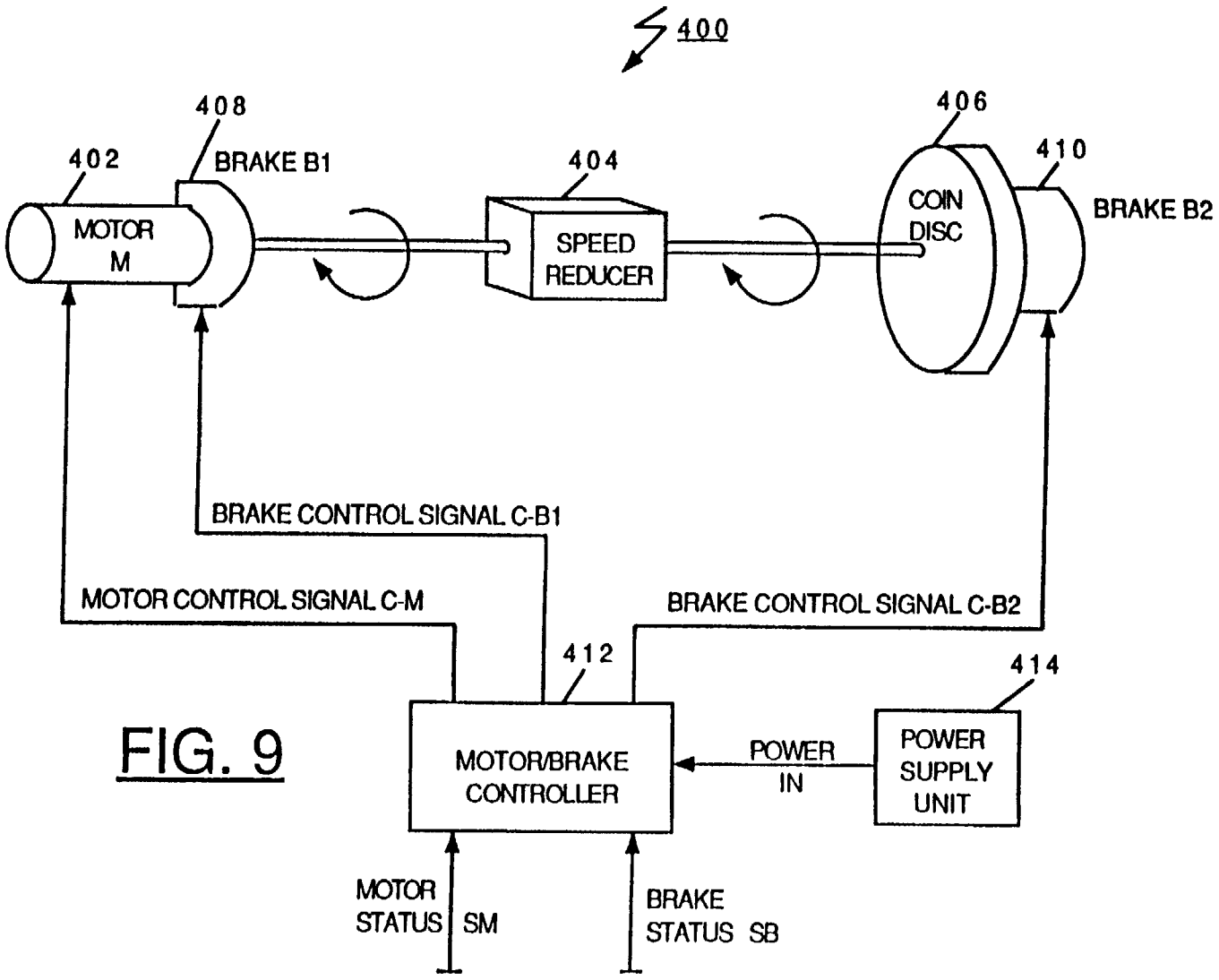
FIG. 9 is a diagram illustrating a dual-brake synchronous braking system according to the principles of this invention.

Referring now to FIG. 9, there is shown a preferred arrangement for implementing a synchronous braking system in accordance with the principles of the present invention. The arrangement is particularly suited for achieving the synchronous operation of the dual-brake braking system described above. As shown in FIG. 9 therein, the drive motor 402 for the coin sorter means is connected through a speed reducer 404 to the coin disc 406 used for the sorting operation. The motor 402 operates at a nominal speed V1 with an effective moment of inertia J1 to generate a torque T1 at its output. The speed reducer 404 is in the form of a conventional gear train adapted to down-convert the motor speed to the speed V2 at which the coin disc is to be rotated. On the basis of its mass, the coin disc 406 operates under a moment of inertia J2 and generates an output torque designated as T2.

The motor 402 is provided with a brake B1 (designated as 408) which is normally inactive during the operation of the motor 402 and is adapted to bring the rotation of the motor 402 to a halt upon being activated. The arrangement described so far is conventional and generally includes some means for controlling the operation of the motor 402 through a motor control signal C-M and for controlling the brake 408 through a brake control signal C-B1. The control means required with such a conventional arrangement is relatively simple since the control aspect is restricted to insuring that the motor 402 and the brake 408 associated therewith are operated in a mutually exclusive manner. More specifically, it only needs to be insured that the motor control signal C-M is deactivated anytime the brake control signal C-B1 is activated in order to operate the brake 408 when it is desired that the motor 402 be braked to a halt.

As discussed above, a conventional single-brake arrangement of the above type has a variety of inherent practical problems, the most significant of which is the fact that the braking torque generated by the brake 408 is necessarily transmitted through the speed reducer 404 to the load connected thereto, i.e., to the coin disc 404. While the torque multiplication resulting from the action of the speed reducer 404 allows a small amount of braking torque at the motor end to be amplified sufficiently enough to bring about braking of the coin disc, the high torque level at the speed reducer, in combination with the inertia generated at the coin disc end, can have a potentially destructive effect on the gears used in the speed reducer gear train.

More specifically, when the brake 408 is activated, the spinning mass corresponding to the motor end of the speed reducer 404 rapidly decelerates. At the same time, the spinning mass corresponding to the coin disc end of the speed reducer 404 continues spinning virtually at full speed under its own inertia. The braking action, thus, produces a substantial torque displacement on either side of the speed reducer, thereby subjecting the speed reducer to high shock loads, each time the brake is activated. Accordingly, repeated application of the braking torque using a conventional single-brake arrangement results in early breakdown of the gear train and substantially reduces the life of the operating system.

Conventional single-brake systems also suffer from counting errors resulting from wind-up or oscillations of the speed reducer when braking occurs. The torque differential existing on the two ends of the speed reducer when the braking action is applied produces a relative angular deflection of the shafts connected to the speed reducer which, in turn, produces a whipping or oscillating motion of the coin disc. Such oscillations can, in turn, cause a single coin to oscillate across the coin sensor arrangement, thereby leading to multiple counting of the same coin.

These and other problems associated with conventional brake braking systems are obviated in accordance with the system of this invention, by the provision of a second brake B2 (designated as 410) operating in association with the coin disc 406. The brake 410 is similar to the motor brake 408 and is controlled by a brake control signal C-B2 which, when activated, energizes the brake 410 in such a way as to supplement the action of the first brake 408 and bring the rotating coin disc 406 to a halt.

In accordance with a significant aspect of this invention, the two brakes 408 and 410 are operated in synchronism so that both brakes are energized simultaneously when it is desired that the motor 402 be brought to a halt from its rotating action. According to a preferred embodiment, a microprocessor-based motor/-brake controller 412 is provided for selectively controlling the motor control signal C-M, the brake control signal C-B1 and the brake control signal C-B2 so as to achieve synchronized braking action of the motor brake B1 and the disc brake B2. The controller 412 receives the various power signals necessary for controlling the motor 402 and the brakes B1 and B2 from a power supply unit 414. In addition, the controller 412 receives a motor status signal SM and a brake status signal SB which respectively correspond to the operational status of the motor 402 and the coin disc 406, as required by the overall coin sorter system.

According to the principles of this invention, the synchronized operation of the two brakes is achieved with respect to two separate aspects of the braking operation. According to the first aspect, an arrangement is provided for improving the activation times of the brakes to such an extent that both the brakes respond almost instantaneously when control signals associated therewith are activated; the arrangement ensures synchronism in the activation of the two brakes. The motor/brake controller 412 essentially functions to utilize the motor and brake status signals SM, SB to respectively generate the brake control signals C-B1 and C-B2 in such a way that the time required for initiating the braking action of the brake B1 corresponds substantially to the time required for initiating the braking action of the brake B2, as will be discussed in detail below.

According to the second aspect, the brakes are individually designed and operated in such a way that the time taken by the motor brake to halt motor rotation corresponds substantially to the time taken by the coin disc brake to halt rotation of the coin disc. Thus, synchronism of the stopping times of the two brakes is ensured. The synchronism of the stopping times of the motor and disc brakes is important in view of the differing values of inertia and braking torque on the two ends of the speed reducer 404. By realizing substantial equality between the braking times of the motor 402 and the coin disc 406, the application of any damaging torque to the gear train in the speed reducer 404 as a result of the independent braking actions of the two brakes is avoided.

More specifically, the speed reducer 404 in the arrangement of FIG. 7 is adapted to bring about a speed reduction corresponding to a selected ratio N:1, where N is typically about 7–10. Thus, when only the motor-end brake B1 is used and energized, the motor speed and the rotational speed at the output of the speed reducer 404 is gradually reduced to zero so that the coin disc is brought to a halt. However, because of the higher speed at the motor end, the braking torque associated therewith is substantially lower than the braking torque at the coin disc end where the operational speed is substantially lowered by the action of the speed reducer 404. When braking occurs, the torque generated as a result of the rotation of the coin disc 406 acts upon the speed reducer gear train even as the rotational action of the motor 402 is brought to a halt, thereby raising the possibility of severe damage to the speed reducer gear train due to the substantial torque displacement on its ends. It should be noted that a similar effect would occur even if the disc brake B2 were used in combination with the motor brake B1, if the braking time of the motor 402 is not matched with the braking time of the coin disc 406.

This important synchronizing function is achieved by controlling the amount of energizing current that is used to activate the two brakes B1 and B2 so as to bring about identical stopping times. Preferably, the coin disc brake B2 is first selected or designed in terms of the braking torque T2 required for counteracting the coin disc-end inertia J2 so as to halt the rotation of the disc within a selected stopping time S2. Subsequently, the motor brake B1 is selected or designed in terms of the braking torque T1 required for counteracting the motor-end inertia J1 so as to halt the rotation of the motor within a selected stopping time ST-1. Preferably, the stopping time ST-1 is selected to be substantially shorter than the stopping time ST-2. When the system is subsequently operated with brakes designed on the above basis, the lower torque requirements at the motor-end necessitate an extension of the stopping time ST-1 of the motor brake B1 in order to equalize that time within the stopping time ST-2 of the coin disc brake B2.

This equalizing of the two stopping times ST-1 and ST-2 is conveniently realized by the use of a load resistance in series with the brake coil of the motor brake B1. Preferably, the resistance is of the variable resistance type so that its value can be varied easily to correspondingly vary the stopping time ST-1 of the motor brake B1 until the time ST-1 corresponds substantially to the stopping time ST-2 of the disc brake B2. Such an arrangement essentially decreases the energizing current for brake B1 to such an extent that the braking torques on both the motor and the disc ends are substantially identical, thereby bringing about correspondingly identical braking times. Under the conditions, synchronism of the stopping times of the motor and disc brakes is achieved.

Figure 10:
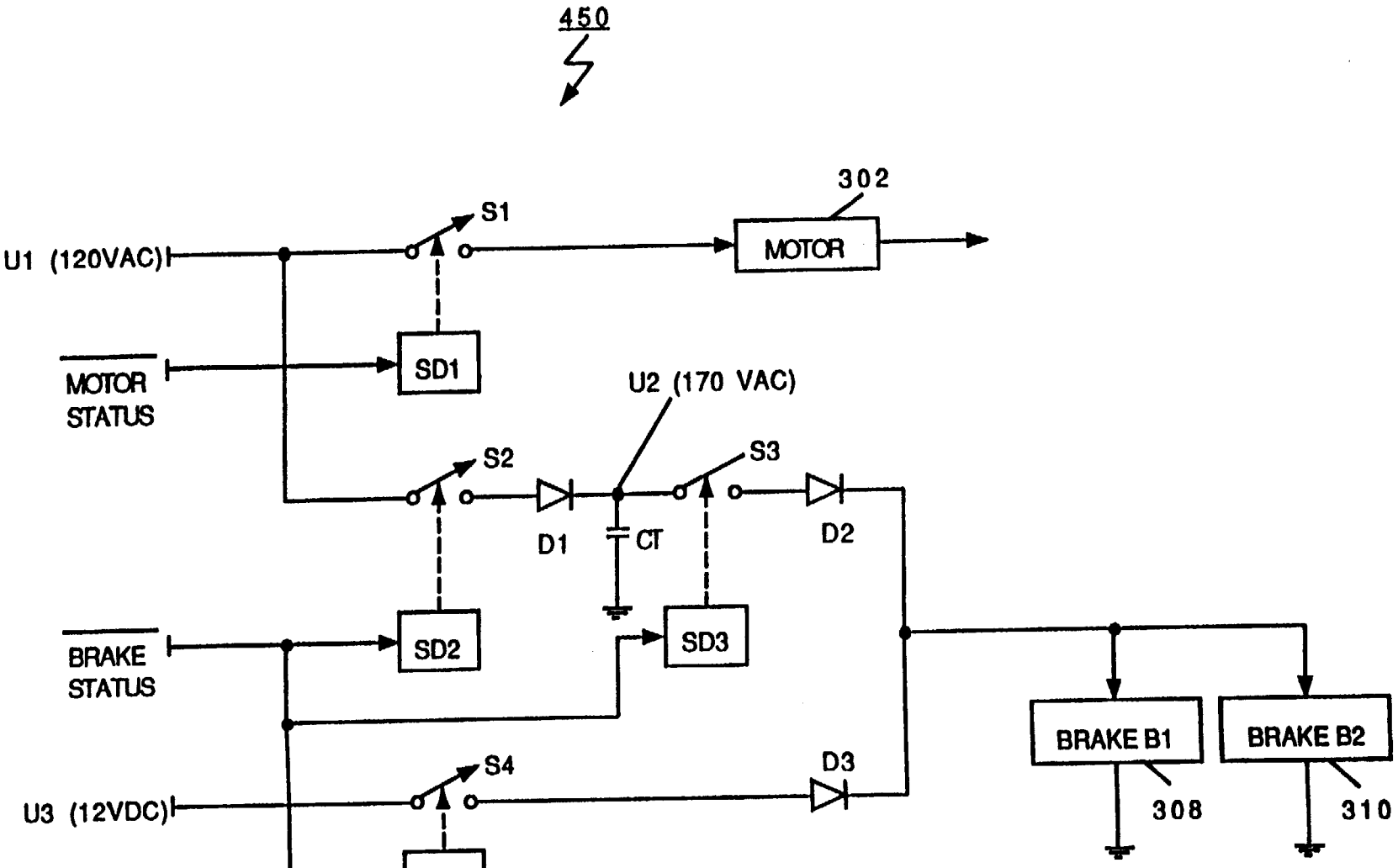
FIG. 10 is a schematic diagram of an illustrative arrangement for controlling the motor and disc brakes shown in the system of FIG. 9.

Referring now to FIG. 10, there is shown a schematic diagram of an illustrative arrangement for controlling the motor and disc brakes used with the synchronous braking system of FIG. 9 in such a way as to achieve simultaneous activation of the brakes. The control arrangement 450 receives a plurality of power signals U1 and U3 from the power supply unit 414 (see FIG. 9). The power signal U1 is a standard 120 volt a.c. signal and is connected through a switch S1 to the motor 302. The action of the switch S1, i.e., its open or closed status, is controlled by a signal from a switch driver SD-1 which, in turn, is activated by the motor status signal SM supplied as one of the inputs to the motor/-brake controller 412. The motor/brake controller 412 activates the driver SD-1 when it is desired that the motor be activated for performing the coin sorting operation. As a result, the switch S1 is also activated, i.e., closed, so that the voltage signal U1 is applied to the motor 302, thereby activating it.

Preferably, the switch S1 is a solid-state switch having an insignificant off delay or activation time. With conventional a.c. or triac-based switches, a significant delay typically occurs before the switch actually closes or opens subsequent to receiving the corresponding activation signal from the switch driver. With the use of a transistorized switch, the motor/brake controller can effectively close or open the switch S1 within an activation time which is negligible (of the order of a tenth of a millisecond) compared to the relatively larger activation times (of the order of tens of milliseconds) for conventional switches.

In the control arrangement of FIG. 10, a tank capacitor CT is provided for boosting the activation current for the two brakes 308 and 310 in order to counteract the standard activation delay associated with the brakes; the standard delay generally results from a combination of the delay due to current buildup time and due to the armature movement time. More specifically, the voltage signal U1 is connected through a second switch S2 and a diode D1 to the tank capacitor CT. The operation of switch S2 is controlled by a switch driver SD-2 which, in turn, is activated by the brake status signal SB supplied as the second input to the motor/-brake controller 412 (see FIG. 9).

The diode D1 effectively rectifies the a.c. signal at its input so that a d.c. signal having a value equal to the peak value of the unrectified signal is applied to the capacitor CT. More specifically, a voltage U2 equal to 120 V*[2]$^{\frac{1}{2}}$, i.e., 170 V, is applied to the capacitor CT. The tank capacitor CT, thus, gets charged by this high voltage signal U2 which is high enough, compared to the steady state brake operating voltage of 12 V, to provide the necessary boosting required for counteracting the activation delays of both the brakes and neutralize in disparities therebetween.

The cathode of the diode D1 is connected through a third switch S3 and a diode D2 to the brakes 308 and 310 for application of a discharge signal from the capacitor CT. The operation of switch S3 is controlled by a switch driver SD-3 which, in turn, is activated by the brake status signal SB.

The steady state operation of the motor brake 308 and the disc brake 310 is realized by a third voltage signal U3 which corresponds to the standard operational d.c. voltage of 12 volts required to maintain the brakes 308 and 310 in an activated state. More specifically, the voltage signal U3 is applied to the brakes 308 and 310 through a switch S4 and an isolating diode D3. The operation of switch S4 is controlled by a switch driver SD-4 which is also activated by the same brake status signal SB used as the basis for activating switches S2 and S3.

Prior to initiation of the braking sequence, i.e., when the brake status signal SB is inactive, the switch driver SD-2 is used to close the switch S2, thereby applying the 120 VAC signal U1 through the diode D1 to the tank capacitor CT. At the same time, the switch driver SD-3 is activated so as to open the switch S3. Under these conditions, the high voltage signal U2 resulting from rectification of the signal V1 charges the capacitor CT.

When it is desired that the brakes be activated, i.e., when the brake status signal SB becomes active, the switch S2 is opened and the switch S3 closed, thereby establishing a discharge path for the energy stored in the tank capacitor CT to be supplied to the brakes. Since the switch S4 is effectively controlled by the brake status signal SB, the switch S4 also closes when the brake status signal becomes active. Accordingly, the 12 VDC signal U3 is applied to the brakes 308 and 310 simultaneously with the discharge voltage VB from the tank capacitor CT.

The opposing connections of the diodes D2 and D3 effectively act as a logical OR for the signals applied thereto. Thus, while both the discharge voltage and the U3 voltage signal are simultaneously linked to the brakes, the larger of the two voltages is in fact applied to the brakes at any given instant. More specifically, immediately upon the brake status signal SB becoming active, i.e., as soon as the system brakes are activated, the discharge voltage VB from capacitor CT and the U3 voltage signal are both connected to the brakes. At that time, however, the discharge voltage, which is a gradually decaying voltage having an initial value of 170 VDC prevails over the U3 voltage of 12 VDC.

The discharge voltage is thus applied to both the brakes immediately upon activation of the brake status signal SB, thereby providing the booster voltage necessary to instantaneously generate the high saturation current required for activating both the brakes in a substantially instantaneous manner. Since the switch S2 is closed at this time, the capacitor voltage subsequently decays gradually to a point where it corresponds to the level of the voltage signal U3. At that point, the voltage signal U3 becomes actively connected to the brakes 308 and 310, thereby continuing to maintain the brakes in their steady state operation condition until both the motor 402 and the coin disc 406 are brought to a stop.

Once the voltage signal U3 comes into play, the switch driver SD-2 is activated to close the switch S2 while the switch driver SD-3 is activated to open the switch S3. Thus, the high voltage signal U2 again becomes available to initiate the recharging of the tank capacitor CT.

Figures 11A, 11B, 11C, 11D, 11E, 11F, 11G:
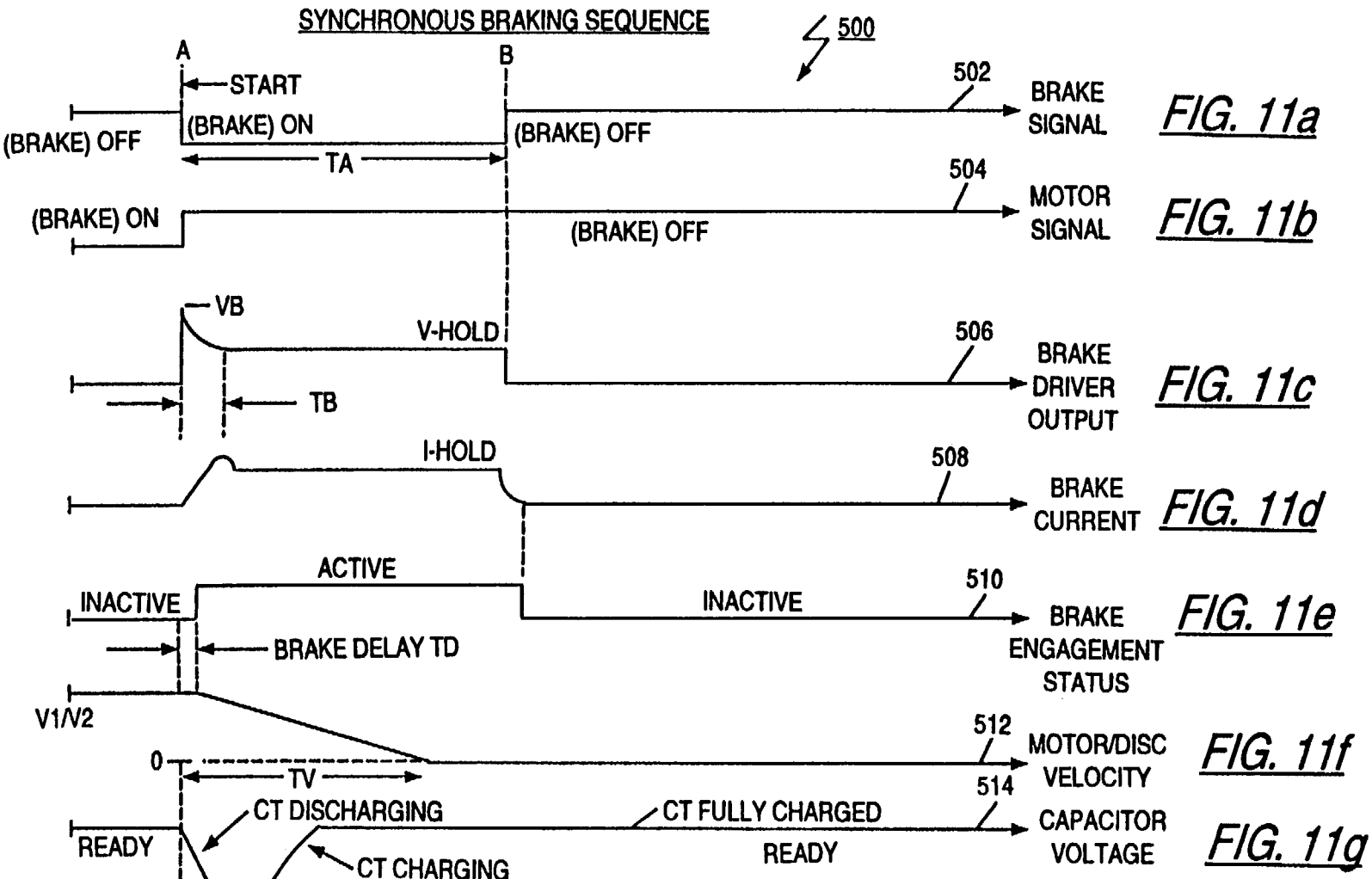
*FIGS. 11A–G are* a graphical representation of various control and status signals associated with the control system of FIG. 10.

Referring now to FIG. 11, there is shown a graphical representation 500 of the various control and status signals associated with and illustrating the operation of the control system of FIG. 10 in achieving the synchronous braking sequence according to the present invention. As shown therein, the brake signal 502 is used for activating the switches in its inverse state. Thus, the signal remains high until the synchronous braking sequence is initiated at point A, when the signal goes low and initiates the activation of the brakes. In FIG. 11, the point B marks the moment when both the motor and the coin disc have been brought to a halt and there no longer exists the need to keep the brakes activated. Thus, at point B, the brake signal returns to its inactive high status.

The motor signal 504 is also active in its inverse status and, accordingly, remains low prior to the point A when the braking sequence is initiated. In other words, the motor remains activated prior to the point A and the motor signal goes inactive or high at point A so as to deactivate the motor.

The waveform designated as 506 corresponds to the signal at the brake terminals. As shown, this signal is boosted up to the charge value (170 VDC) of the tank capacitor CT upon initiation of the braking sequence at point A. At this point, the switch S2 is opened and the switch S3 closed in the illustrative control system of FIG. 10. Thus, the discharge voltage VB is applied through the switch S3 and the diode D2 to the brakes 308 and 310. It should be noted that, at the same time, the voltage signal U3 is also applied to the brakes by closing the switch S4. However, because the discharge voltage VB predominates, the waveform 506 does not reflect the effect of the signal U3 until the discharge voltage VB has decayed to a level V-HOLD equivalent to the voltage level of the signal U3.

The time delay TB required for the discharge voltage VB to decay to the level V-HOLD represents the time period for which the discharge voltage acts as a booster voltage for instantaneously activating the two brakes 308 and 310. For the remaining period for which the brakes remain activated, i.e., up until the point B in FIG. 11, the brakes remain activated by the 12 VDC signal U3. At point B, the switch S4 is opened so that the voltage signal U3 is removed from the brakes, thereby deactivating the brakes completely. Thus, at point B, the brake driver output 506 drops to zero.

The brake current 508 essentially tracks the brake driver output signal 506. More specifically, the brake current is boosted up when the braking sequence is activated at point A as a result of application of the discharge voltage VB to the brakes. During the delay period TB, the brake current continues rising and at the end of that period, the brake current drops down to a level I-HOLD which corresponds to the voltage V-HOLD necessary for steady state activation of the brakes. At the end of the braking sequence, i.e., at point B, the brake current drops exponentially to zero from the steady state value I-HOLD.

In FIG. 11, the waveform 510 represents the brake engagement status of the two brakes. As shown, the brakes remain inactive prior to initiation of the braking sequence at point A. The brakes also remain inactive for an additional delay period TD following activation of the brakes at point A; this delay TD corresponds to the finite brake activation delay required for armature activation and current saturation despite the application of the high discharge voltage. This inherent brake delay TD is, however, negligible in comparison with the brake delay that would otherwise occur if the discharge or booster voltage VB were not used. Following the brake delay TD, the brakes move into their active or engaged status until the end of the braking sequence at the point B, whereupon the brakes revert to their inactive status.

In FIG. 11 the waveform 512 represents the velocities V1, V2 respectively of the motor and the coin disc in relation to the synchronous braking sequence. These velocities initially remain at their operational level corresponding to the motor being active during the standard coin sorting operation. These velocities are maintained for a period corresponding to the brake delay TD following the activation of the braking sequence at point A. As the brakes are actively engaged, the velocities V1 and V2 gradually drop to zero. The time period TV required for the motor and disc velocities to drop to zero is somewhat less than the brake activation period TA.

In FIG. 11, the waveform 514 represents the voltage level of the tank capacitor CT in relation to the braking sequence. Prior to initiation of the sequence at point A, the capacitor CT is in its ready or charged state which, in the illustrative embodiment, corresponds to the 170 VAC level. At point A, discharging of the capacitor is initiated and the capacitor voltage VB gradually drops down to the level corresponding to the voltage signal U3, i.e., 12 VDC. At this point, the discharge potential for the capacitor is effectively neutralized and the capacitor voltage VB is essentially maintained at the level of the signal U3. After the passage of a time period TC, which insures that the steady state voltage level for the brakes has been established by directly connecting the voltage signal U3 thereto, the tank capacitor starts charging again as a result of the charging switch S2 being closed. This charging continues until the tank capacitor attains its fully charged or ready status.

It should be noted that the above-described control system can operate effectively despite the fact that the brake activation times for the motor brake and the disc brake may be somewhat different in practice. For instance, because of the lower torque factor at the motor end, the motor brake typically engages in about 0.3 milliseconds, whereas the disc brake, by virtue of its correspondingly higher torque factor, engages in about 1.0 milliseconds. However, differences of the magnitude of 0.1–0.5 milliseconds are negligible in terms of synchronized brake operation. As described above, it is important that the dual-braking system operate in such a manner that one of the brakes does not operate alone for a substantial amount of time relative to the other brake. Thus, the effective torque displacement on either end of the speed reducer, and, hence, the shockload appearing on the gear train of the speed reducer, are maintained within manageable levels as long as the activation and braking times for the two brakes substantially correspond to each other.

Using a synchronized dual-brake system of the foregoing type, the coin disc can be brought to a complete stop, even under fully loaded conditions, within an angular movement of the disc of only about eight (8) degrees. This restricted angular rotation of the disc corresponds to stopping times of about ten (10) milliseconds and is sufficient to completely prevent discharge of any additional unwanted coins once the synchronized braking sequence has been initiated following the counting of the preselected number of coins.

In a practical implementation of a synchronized braking system of the above-described type, it is important not only that the motor and coin disc brakes operate in a synchronous fashion, but that each of the brakes operate only when the other brake is also activated. In other words, it is important that when one of the brakes fails for any reason, the other brake be immediately deactivated. Otherwise, the resulting disparity in torque displacement on either end of the speed reducer could easily lead to destruction of the gear train disposed therein. Accordingly, some form of signal monitoring device (not shown) is associated with the input signals to each of the two brakes so that when one of the input signals is found to be non-existent, the other input signal is immediately deactivated.

Using the above-described illustrative arrangement, the microprocessor-based motor/brake controller used for controlling the synchronized operation of the two brakes can also be used, in conjunction with a monitoring device associated with the drive voltage currents for the two brakes, so that the voltage applied to the brake coils may be independently varied (for instance, by correspondingly varying separate serially connected variable resistances) to compensate for torque and other variations between the two brakes over the lifetime of the coin sorter system. Such an arrangement can effectively counteract any deviation in the synchronous operation of the motor and coin disc brakes resulting from variations in torque and other parameters over prolonged use of the braking system during in-field use of the coin sorter.

We claim:

1. In a coin sorter having a rotatable disc with a resilient surface and a stationary guide plate positioned adjacent said resilient surface for guiding coins on said resilient surface as said disc is rotated, counting means for counting coins of at least one denomination as the coins are processed by said sorter, an electric motor having an output shaft for driving said rotatable disc, a speed-reducing gear train connected between the output shaft of said electric motor and said rotatable disc, first brake means coupled to the output shaft of said motor and adapted to stop rotation thereof, second brake means coupled to said coin disc and adapted to stop rotation thereof, and means responsive to said counting means for controlling the operation of said first and second brake means in such a manner as to stop said rotatable disc when a preselected number of coins have been counted.

2. The coin sorter of claim 1 wherein each of said brake means comprises an electrically powered brake, and the coin sorter includes means for de-energizing said motor and energizing said braking means in response to the counting of said preselected number of coins.

3. The coin sorter of claim 2 wherein said first and second brake means are adapted to be energized in a substantially simultaneous manner in response to a signal from said counting means indicating that said preselected number of coins have been counted.

4. The coin sorter of claim 3 wherein said brake control means is adapted to energize said first and second brake means in response to said count indicating signal in such a way that the time required for said first brake means to stop the rotation of said motor output shaft is substantially equal to the time required for said second brake means to stop the rotation of said coin disc.

5. The coin sorter of claim 3 wherein each of said brake means includes an armature coil adapted to receive an energizing voltage for energizing and operating said brake means, and wherein said brake control means is adapted to maintain said energizing voltages for said brake means at a first high level for a first predetermined period of time so as to energize both of said brake means at substantially the same times, and for maintaining said energizing voltages at a second level substantially lower than said first level for a second predetermined time which exceeds said stopping times of both of said brake means.

6. The coin sorter of claim 5 wherein said control means includes means for insuring that said brake means are activated only when said electric motor is deactivated and vice versa.

7. The improved coin sorting and counting apparatus as set forth in claim 6 wherein said brake control means includes means for energizing said first and second brake means in a substantially simultaneous manner whereby said first and second brake means respectively begin stopping said motor and said coin disc at the same time.

8. Improved apparatus for sorting and counting coins at a high speed and level of accuracy, comprising:

a coin disc rotatably mounted within a housing;

a motor mounted in said housing, said motor including an output shaft rotated by said motor, means for mechanically coupling said coin disc to said output shaft of said motor;

first brake means coupled to said motor and operable to stop the rotation of said output shaft of said motor when said brake means is energized;

second brake means coupled to said coin disc and operable to stop the rotation of said coin disc when said brake means is energized; and means for controlling the energization of said first brake means and said second brake means to stop the rotation of said motor and said coin disc at substantially the same time.

9. The apparatus for sorting an counting coins as set forth in claim 8 wherein said first and second brake means are electrically activatable friction brakes.

10. The apparatus for sorting and counting coins as set forth in claim 8 wherein said second brake means is a disc brake including a brake disc secured to said coin disc, an electrical coil secured to said housing adjacent to said brake disc, and friction means engageable by said brake disc upon energization of said second brake means.

11. The apparatus for sorting and counting coins as set forth in claim 8 wherein said second brake includes an electrical coil secured to said housing, a brake disc adjacent to and engageable with said coil, and a diaphragm spring flexibly connecting said brake disc to said coin disc.

12. The apparatus for sorting and counting coins as set forth in claim 8 wherein said coin disc includes a thin plate with a rim, a hub and an upper planar surface and a lower planar surface, said lower planar surface of said coin disc extending from said rim to said hub having fins formed thereupon, said fins being thicker at said hub than at said rim.

13. The apparatus for sorting and counting coins as set forth in claim 8 wherein said coin disc includes a thin plate, a central hub secured to said plate, and a hollow come extending below said plate and secured to said plate and said hub.

14. The apparatus for sorting and counting coins as set forth in claim 8 wherein said coin disc includes a metal plate brazed to a honeycomb disc.

15. The apparatus for sorting and counting coins as set forth in claim 8 wherein said coin disc includes a planar member of composite material.

16. The apparatus for sorting and counting coins as set forth in claim 8 wherein said first brake and said second brake, in combination, stop the rotation of said coin disc in about ten milliseconds.

17. An improved braking method for quickly and accurately halting the rotation of a coin disc in a coin sorting and counting system wherein an electrical motor is rotatably coupled to the coin disc through speed reducer means, said method comprising the steps of:

(i) providing a first brake means disposed on one side of said speed reducer means and operable to halt the rotation of said motor;

(ii) providing a second brake means disposed on the other side of said speed reducer means and operable to halt the rotation of said coin disc; and (iii) operating said first and second brake means so that the time taken by said first braking means to halt the rotation of said motor is substantially equal to the time taken by said second brake means to halt the rotation of said coin disc.

18. The improved braking method as set forth in claim 17 wherein said first and second brake means are energized in a substantially simultaneous manner when the halting of said coin disc is initiated.

19. The improved braking method as set forth in claim 18 wherein said brake means are both responsive to an energizing voltage applied thereto and wherein the method includes the steps of applying a first high energizing voltage to both of said brake means for a first predetermined time period so as to energize said brake means at substantially the same time, and applying a second low energizing voltage to both of said brake means for a second predetermined time period which is equal to or larger than the stopping times of each of said brake means.

20. A braking system for quickly and accurately stopping the rotation of a coin disc in a coin sorting and counting system comprising an electric motor rotatably driving a coin disc through a mechanical coupling means, said system comprising:

first brake means coupled to said motor for stopping the rotation thereof;

second brake means coupled to said coin disc for stopping the rotation thereof; and control means for operating said first and second brake means in synchronism so as to stop the rotation of said coin disc without exerting shock loads on said mechanical coupling means.

21. The braking system according to claim 20 wherein said first and second brake means are electrically activatable brakes adapted to respectively stop the rotation of said motor and said coin disc within substantially identical time periods.

22. The braking system as set forth in claim 21 wherein both of said brake means are activated by application of an energizing voltage thereto, and said control means includes means for applying a first, relatively high energizing voltage to said brakes for a first predetermined time period so as to energize both of said brake means at substantially the same time, and means for applying a second, relatively low energizing voltage to said brakes for a second predetermined time period which is substantially longer than said first time period.

*23. In a coin sorter having a rotatable disc with a resilient surface and a stationary guide plate positioned adjacent said resilient surface for guiding coins on said resilient surface as said disc is rotated,*

*counting means for counting coins of at least one denomination as the coins are processed by said sorter,*

*an electric motor having an output shaft for driving said rotatable disc,*

*a speed-reducer connected between the output shaft of said electric motor and said rotatable disc,*

*a first rotation arrestor coupled to the output shaft of said motor and adapted to stop said rotatable disc from being rotated by said motor,*

*a second rotation arrestor coupled to said coin disc and adapted to stop rotation thereof, and*

*means responsive to said counting means for controlling the operation of said first rotation arrestor and said second rotation arrestor in such a manner as to stop said rotatable disc when a preselected number of coins have been counted.*

*24. The coin sorter of claim 23 wherein each of said first rotation arrestor and said second rotation arrestor comprises an electrically powered brake, and the coin sorter includes means for de-energizing said motor and energizing said first rotation arrestor and said second rotation arrestor in response to the counting of said preselected number of coins.*

*25. The coin sorter of claim 24 wherein said first rotation arrestor and said second rotation arrestor are adapted to be energized in a substantially simultaneous manner in response to a signal from said counting means indicating that said preselected number of coins have been counted.*

*26. A braking system for quickly and accurately stopping the rotation of a coin disc in a coin sorting and counting system comprising an electric motor rotatably driving a*

*coin disc through a mechanical coupling means, said system comprising:*

*a first rotation arrestor coupled to said motor for stopping said coin disc from being rotated by said motor;*

*a second rotation arrestor coupled to said coin disc for stopping the rotation thereof; and*

*control means for operating said first rotation arrestor and said second rotation arrestor in synchronism so as to stop the rotation of said coin disc without exerting shock loads on said mechanical coupling means.*

*27. The braking system according to claim 26 wherein said first rotation arrestor and said second rotation arrestor are electrically activatable brakes adapted to respectively stop the rotation of said motor and said coin disc within substantially identical time periods.*

*28. The braking system as set forth in claim 27 wherein said first rotation arrestor and said second rotation arrestor are both activated by application of an energizing voltage thereto, and said control means includes means for applying a first, relatively high energizing voltage to said brakes for a first predetermined time period so as to energize said first and second rotation arrestors at substantially the same time, and means for applying a second, relatively low energizing voltage to said brakes for a second predetermined time period which is substantially longer than said first time period.*

* * * * *